(No Model.)

C. E. BALL.

DYNAMO ELECTRIC MACHINE.

No. 284,357. Patented Sept. 4, 1883.

WITNESSES

INVENTOR
Chas. E. Ball
by
Connolly Bros.
ATTORNEYS (No Model.) 2 Sheets—Sheet 2.

C. E. BALL.
DYNAMO ELECTRIC MACHINE.

No. 284,357. Patented Sept. 4, 1883.

Witnesses
S. Edgar Mahan
Harry Standiford

Inventor
Chas. E. Ball
By
Connoly Bros. Atty's

UNITED STATES PATENT OFFICE.

CHARLES E. BALL, OF PHILADELPHIA, PENNSYLVANIA.

DYNAMO-ELECTRIC MACHINE.

SPECIFICATION forming part of Letters Patent No. 284,357, dated September 4, 1883.

Application filed February 19, 1883. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Dynamo-Electric Machines; and I do hereby declare the following to be a full, clear, and exact description of the invention, such as will enable others skilled in the art to which it pertains to make and use it, reference being had to the accompanying drawings, which form part of this specification, in which—

Figure 1:
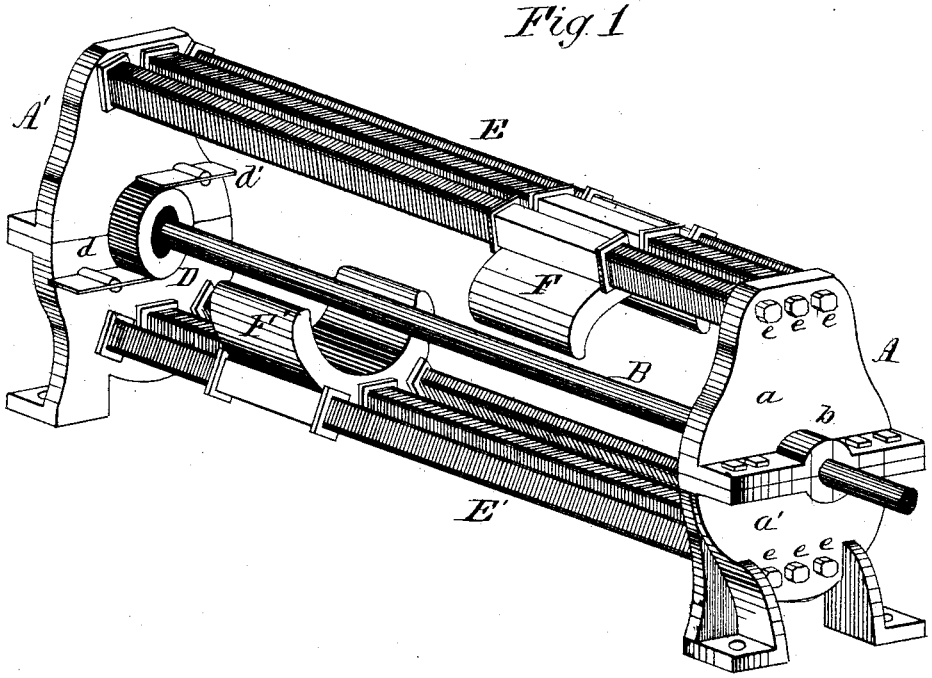
Figure 2:
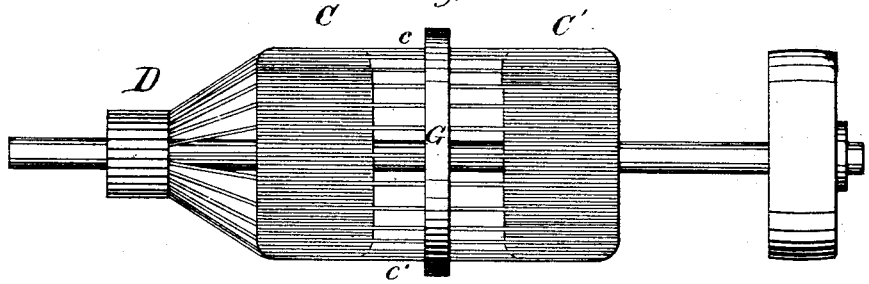
Figure 3:
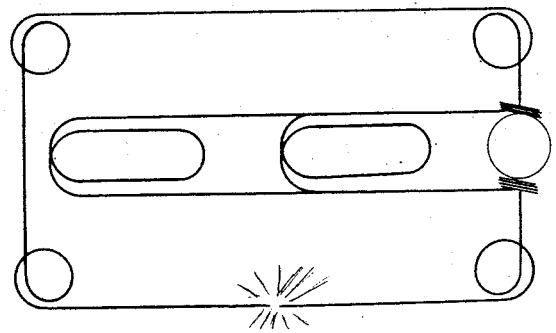

Figure 1 is a perspective, the armatures removed. Fig. 2 is a plan of two armatures on shaft. Fig. 3 is a diagram showing connections between armatures.

My invention has relation to that class of dynamo-electric machines wherein the armature rotates within the influence of but one pole of the field, of which the machine shown, described and claimed in Letters Patent of the United States granted to me, dated June 20, 1882, No. 259,791, is the prototype. In said Letters Patent is shown and described a machine constructed with two armatures, each of which is located and adapted to be rotated in the inductive field of only one pole of a magnet. In the arrangement of circuits shown in the drawings forming part of the specification of said Letters Patent the armatures are shown as intended and adapted to be rotated in contrary directions and under unlike poles, said armatures being mounted upon separate shafts, and in the specification of said Letters Patent it is suggested that said armatures may revolve in the same direction, in which case they may be, it is there said, mounted on one shaft or on independent shafts.

My present improvements have for their object to provide a construction of a dynamo-electric machine in which the armatures are mounted on one and the same shaft, and rotate therefore in the same direction, but under or in the inductive fields of unlike poles of a magnet or magnets.

A further object of my improvements is to provide a construction of machine in which are employed two armatures mounted on one shaft having but a single commutator which is common to both.

A still further object of my invention is to simplify the construction of the machine so as to facilitate the insertion and withdrawal of the armature-shaft, as hereinafter fully described.

My improvements consist in the peculiar construction and combinations of parts, as hereinafter fully described and claimed.

Referring to the accompanying drawings, A and A' represent the ends or heads of the machine, which are castings, each of which is made in two parts, $a\ a'$, flange-bolted together at $a^2$, boxes or bearings being formed in their adjacent edges.

B represents the armature-shaft, which has its bearings in boxes $b\ b'$ in the heads or ends A A', said shaft thus being located between the sections $a\ a'$, so that on lifting off the upper sections it may be readily inserted and withdrawn from position. Said shaft carries two ring-armatures, C C'. The armature C is wound and otherwise constructed in the usual manner, and connected, as customary, with a commutator, D. The other armature, C', has the ends $c\ c'$ of its bobbins carried over and connected to the wires of the bobbins of the armature C.

If it be desired to connect the armatures C and C' for intensity, the wires $c$ and $c'$ are attached to the wires of the armature C in such manner as that the current from said armature C' will flow into and through the bobbins of the armature C. If it be desired to connect said wires for quantity, the wires $c\ c'$ are attached to the ends of the bobbins of the armature C, so that the current from the armature C' will pass around said armature C and flow direct to the commutator D.

E represents the upper field-magnet bars, which are three or more in number, and E' the lower field-magnet bars, which are of like number. These bars connect the heads A and A' and are connected thereto by bolts $e$, or in any other suitable manner. The pole-pieces of said magnets are shown at F and F', and are located at unequal distances from the heads A A'—that is to say, pole-piece F is nearest the head A, and the pole-piece F' nearest the head A'. This leaves a greater length of magnet-bars on one side of each pole-piece than on the other, and the entire surface or extent of each bar, on both sides of the pole-pieces, is covered with insulated wire.

The connections are made so that the circuit is as follows: from the commutator-brush d direct to the terminal wire of the outer end of the first bar of the lower magnet, thence to the other two bars of the same magnet, being wound always in the same direction, thence to the external circuit, thence to the outer end of the short arm of the first bar of the lower magnet, thence to the other two bars of the same magnet in succession, thence across the machine to the first bar of the long arm of the upper magnet, thence to the other two bars of the same arm, thence around the pole-piece to the first bar of the short arm of the same magnet, thence in succession to the other two bars of said arm, thence to the commutator-brush d', thence through the armatures, and from the latter to the brush d'. This produces two magnets, each of which has two arms—a long and a short one—on opposite sides of the machine.

By the construction and arrangement of circuits described, the two magnetic poles are unlike, one being N and the other S. Both armatures are on the same shaft, so that when the latter is revolved said armatures rotate in the same direction, but under or in the inductive field of unlike magnetic poles. Both armatures in their rotation generate electric currents, and as the said two armatures are connected directly together, the currents of both flow out the same commutator, that from C' flowing through C and combining with that of the latter if coupled for intensity, or around C if coupled for quantity. The direction of the current in both armatures with respect to the external circuit is always the same for both, reversals of current in each taking place simultaneously.

To support the wires c c' between the armatures, there is provided a disk, G, of wood or other non-conducting material, which is made fast on the shaft B to rotate with the latter. This disk has numerous perforations, g g', through which pass the connecting-wires c c'.

If desired, the shaft B may be in two sections; but there are obvious objections to this, so that I prefer and intend always to use but a single shaft.

The advantages of the construction herein described are that while there are two armatures employed, there is but one commutator required, and that both said armatures may be connected for quantity in such manner as to decrease the internal resistance of the machine.

What I claim as my invention is as follows:

1. In a dynamo-electric machine, the combination of two armatures on the same shaft, coupled or connected together as set forth, each of said armatures being located and adapted to be rotated in the inductive field of only one pole of a magnet, said machine having two unlike magnetic poles, substantially as shown and described.

2. The combination, in a dynamo-electric machine having pole-pieces on opposite sides of the machine, of magnet-bars of different lengths on the two sides of the pole-pieces, said bars being wound over their entire extent except where the pole-pieces are located, substantially as shown and described.

3. The combination, in a dynamo-electric machine, of two armatures coupled or connected together, as set forth, and two pole-pieces on opposite sides of the machine, both of said armatures being on the same shaft or adapted to be rotated in the same direction, each of said armatures being located and adapted to be rotated in the inductive field of only one pole, and said poles being of unlike sign, substantially as set forth.

4. The combination of the armatures C C', connected by the wires c c' with the supporting-disk G, substantially as shown and described.

In testimony that I claim the foregoing I have hereunto set my hand this 17th day February, 1883.

CHAS. E. BALL.

Witnesses:
ROBERT J. OWEN,
M. D. CONNOLLY.